United States Patent
Yamashita et al.

(10) Patent No.: US 8,212,482 B2
(45) Date of Patent: Jul. 3, 2012

(54) AUTOMOTIVE ILLUMINATION DEVICE WITH WELCOME ILLUMINATION FEATURE

(75) Inventors: Takeshi Yamashita, Shizuoka (JP); Tomohiro Nishikawa, Kanagawa (JP); Yoshihiro Ebisu, Kanagawa (JP)

(73) Assignee: Yazaki Corporation, Tokyo (JP)

( * ) Notice: Subject to any disclaimer, the term of this patent is extended or adjusted under 35 U.S.C. 154(b) by 161 days.

(21) Appl. No.: 12/844,324

(22) Filed: Jul. 27, 2010

(65) Prior Publication Data

US 2011/0025208 A1 Feb. 3, 2011

(30) Foreign Application Priority Data

Jul. 28, 2009 (JP) ................... 2009-175546

(51) Int. Cl.
*B60Q 1/26* (2006.01)
(52) U.S. Cl. ................. 315/80; 315/77; 315/82; 315/84
(58) Field of Classification Search .......... None
See application file for complete search history.

(56) References Cited

U.S. PATENT DOCUMENTS

2004/0104815 A1* 6/2004 Suyama et al. .......... 340/426.16
2007/0030136 A1 2/2007 Teshima et al.
2008/0315598 A1 12/2008 Takafuji et al.
2009/0066255 A1* 3/2009 Nakayama et al. ............. 315/77

FOREIGN PATENT DOCUMENTS

| JP | 5-338489 | 12/1993 |
| JP | 11-198722 | 7/1999 |
| JP | 2001-71812 | 3/2001 |
| JP | 2007-39982 | 2/2007 |
| JP | 2009-1153 | 1/2009 |

* cited by examiner

*Primary Examiner* — Anh Tran
(74) *Attorney, Agent, or Firm* — Finnegan, Henderson, Farabow, Garrett & Dunner, L.L.P.

(57) ABSTRACT

An automotive illumination device includes a dome lamp bulb, a transistor switch, an in-vehicle unit, a door status detection unit, and a microcontroller. When user's access to an automobile has been detected by the in-vehicle unit, the microcontroller controls ON/OFF operation of the transistor switch at duty ratio of 60 percent to turn on the dome lamp bulb at brightness of 60 percent (welcome illumination state or mode). When opening of a door of the automobile has been detected by the door status detection unit during the welcome illumination, the microcontroller controls the ON/OFF operation of the transistor switch to always close the transistor switch (at duty ratio of 100 percent) to illuminate the dome lamp bulb at brightness of 100 percent.

2 Claims, 8 Drawing Sheets

AUTOMOTIVE ILLUMINATION DEVICE WITH WELCOME ILLUMINATION FEATURE

CROSS REFERENCE TO RELATED APPLICATION

The priority application Japan Patent Application No. 2009-175546 upon which this patent application is based is hereby incorporated by reference.

BACKGROUND OF THE INVENTION

1. Field of the Invention

The present invention generally relates to an illumination device for automobiles and other vehicles, and in particular to an automotive illumination device that controls a state of illumination of an automotive light or a lamp.

2. Description of the Related Art

Figure 7:
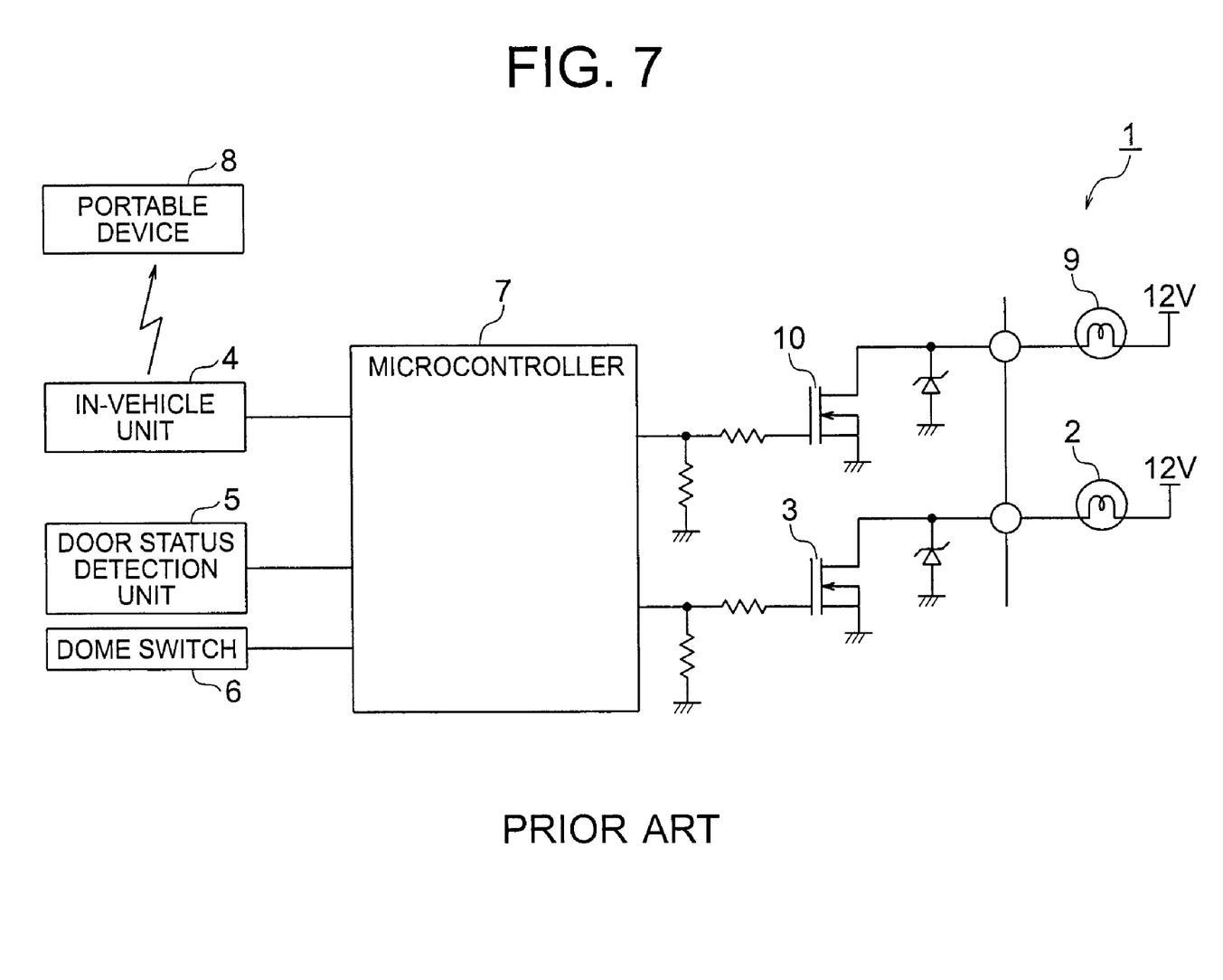
FIG. 7 is an exemplary circuit diagram of a conventional automotive illumination device.

FIG. 7 illustrates an example of a conventional automotive or vehicle-installed illumination device 1 (known devices of this kind are advocated for example in Japanese Patent Application Laid-Open Publications No. H05-338489 and No. 2001-71812).

The exemplary automotive illumination device 1 incorporates (a) a dome lamp bulb 2, (b) a transistor switch 3, (c) a door status detection unit 5, which serves as a "door status detection unit" in the context of the present invention, (d) a dome switch 6 that allows the dome lamp bulb 2 to be manually turned on and off, the dome switch 6 serving as a "manipulation unit" in the context of the present invention, and (e) a microcontroller 7, which serves as an "illumination control unit" in the context of the present invention.

Operations of the microcontroller 7, which controls overall functionality of the illumination device 1, can be summarized as follows.

When the door status detection unit 5 detects opening of a door of the automobile, the microcontroller 7 controls the transistor switch 3 to turn on the dome lamp bulb 2 of the automobile by gradually making the bulb 2 brighter.

Figure 8A:
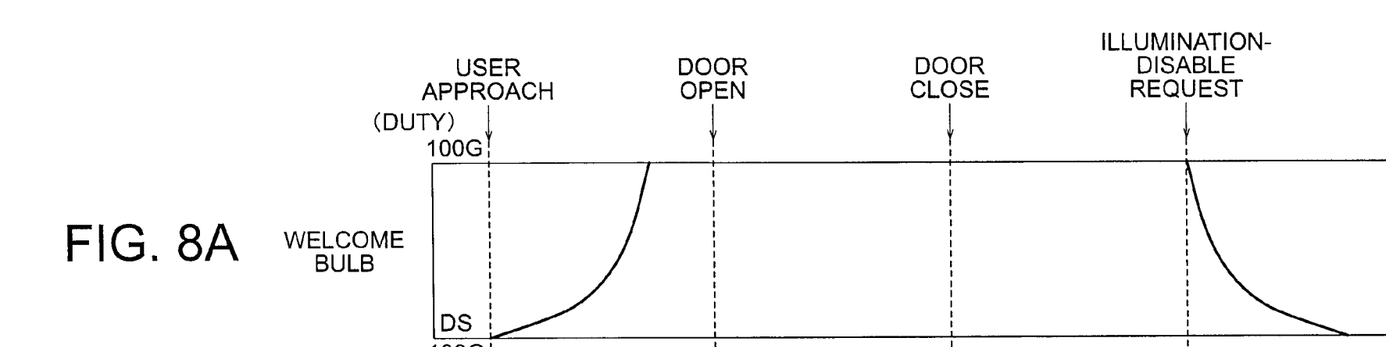
FIG. 8A is a timing chart indicating an illumination state of a dome lamp bulb of the automotive illumination device of FIG. 7.
Figure 8B:
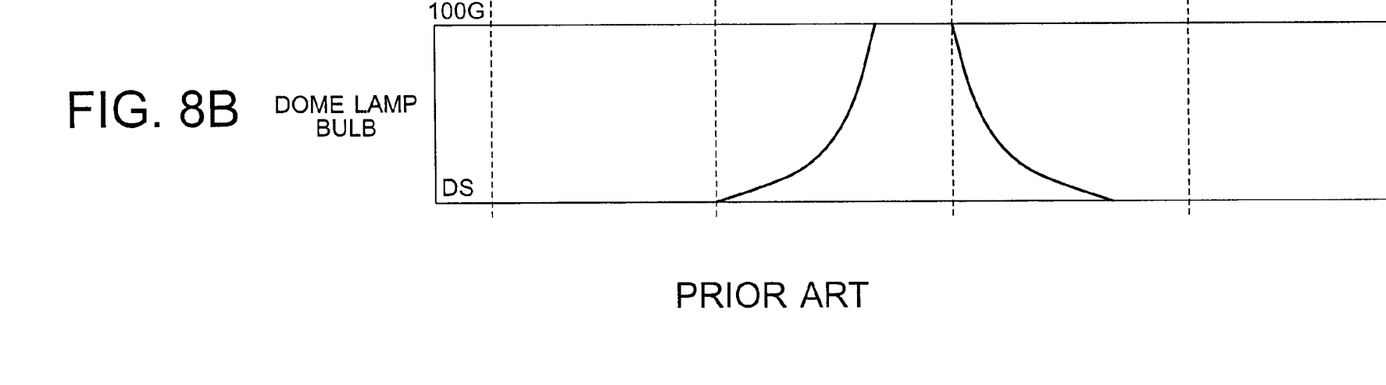
FIG. 8B is a timing chart indicating an illumination state of a welcome dome lamp of the automotive illumination device of FIG. 7.

In contrast, when the door status detection unit 5 detects closure of the door, the microcontroller 7 controls the transistor switch 3 and makes the dome lamp bulb 2 gradually dimmer to turn off the dome lamp bulb 2 (see (B) of FIG. 8).

Also, when the dome switch 6 is turned on, the microcontroller 7 closes (turns on) the transistor switch 3 to illuminate the dome lamp bulb 2.

In contrast, when the dome switch 6 is turned off, the microcontroller 7 opens (turns off) the transistor switch 3 to turn off the dome lamp bulb 2.

In recent years, increasing types of automobiles feature a smart entry system that controls locking and unlocking of the door of the automobile without the aid of a mechanical key.

The smart entry system includes an in-vehicle unit 4 and a portable device 8, and locking and unlocking of the door can be controlled by the communications between them.

Specifically, the in-vehicle unit 4 is configured to transmit a request signal to the portable device 8. When the request signal is received by the portable device 8 carried by a user of the automobile approaching the automobile from an outside thereof, then the portable device 8 transmits an answer signal containing an authentication code. When the answer signal is received by the in-vehicle unit 4, the in-vehicle unit 4 checks the received authentication code contained in the answer signal against an authentication code previously stored in the in-vehicle unit or any external memory unit connected thereto. If the authentication is successful, then the door and/or a luggage door of the automobile are locked and unlocked in response to the user's operation of the door handle and/or the luggage door's handle.

In a case of the automobile incorporating such smart entry features, the microcontroller 7 of the automotive illumination device 1 will control the transistor switch 10 to illuminate in a gradual manner a welcome dome lamp 9 provided near the dome lamp when the user carrying the portable device 8 approached the automobile and the authentication was successfully made by the in-vehicle unit 4 (see (A) in FIG. 8). Subsequently, the microcontroller 7 controls the transistor switch 10 to gradually decrease brightness of the welcome dome lamp 9, and finally turns off the lamp 9 when the user opened the door, came in the automobile, closed the door again, and a predetermined period of time has elapsed after closure of the door or when an engine of the automobile has been started after closure of the door (for example, see the Japanese Patent Application Laid-Open Publications No. 2009-1153 and No. 2007-39982).

SUMMARY OF THE INVENTION

In the above-described conventional illumination device 1, since the welcome dome lamp 9 is illuminated when the door is opened and the dome lamp bulb 2 is turned off, the level of brightness can be made different between the event of user's access to the automobile and the event of opening of the door, and thus visual effects are obtained.

The conventional automotive illumination device 1, however, has to incorporate two separate lamps, i.e., the dome lamp bulb 2 and the welcome dome lamp 9 illuminated when the user approaches the automobile, which may cause complications in terms of manufacturing costs.

Also, when the dome lamp bulb 2 and the welcome dome lamp 9 are independently provided, it will be necessary to provide two transistor switches 10 and 3 for independently controlling the welcome dome lamp 9 and the dome lamp bulb 2, which may also contribute to undesirable increase in the manufacturing costs.

A solution to this problem could be that only one single lamp is used and the single lamp is turned on in response to both user's access to the automobile and the opening of the door. However, this approach has a drawback that, since the user's access to the automobile and the opening and closure of the door are often made successively without a large time interval, the illumination state of the only one single lamp does not change when the door is opened, failing to provide visual effect indicative of the opening of the door.

In view of the above-identified drawbacks, an object of the present invention is to provide an automotive illumination device that provides both (A) illumination at the time of door's opening and (B) the illumination at the time of the user's approaching, using a single light or lamp and thus helps reduce the manufacturing costs.

In order to attain the above objective, there is provided an automotive illumination device that includes: a lamp provided in an automobile; a manipulation unit configured to turn on and turn off the lamp; a user position detection unit configured to detect a user's access to the automobile from outside thereof; a door status detection unit configured to detect a door status indicative of opening and closure of a door of the automobile; and an illumination control unit.

The illumination control unit is configured to provide welcome illumination in which the lamp is turned on at a first brightness in response to the user's access to the automobile detected by the user position detection unit, and configured to turn on the lamp at a second brightness if opening of the door is detected by the door status detection unit during the welcome illumination, or if the manipulation unit is turned on during the welcome illumination. The second brightness is larger than the first brightness.

With the construction and arrangement described above, the brightness level increases upon the opening of the door following the user's access to the automobile. The same visual effects can be obtained using the single automotive lamp as using two separate lamps, and thus the manufacturing costs of the illumination device can be reduced.

Preferably, the illumination control unit is configured to provide door-open/switch-on illumination in which the lamp is turned on at a third brightness if the opening of the door is detected by the door status detection unit or the manipulation unit is turned on while the welcome illumination is not entered, and the illumination control unit is configured to turn on the lamp at the second brightness when the user's access to the automobile is detected by the user position detection unit during the door-open/switch-on illumination. The third brightness is lower than the second brightness.

With the construction and arrangement described above, the brightness level of the lamp increases when the user approaches the automobile while the manipulation switch is turned on or the door is opened. The same visual effects can be obtained using the single lamp as using two separate lamps, and this will also contribute to further reduction of the manufacturing costs of the illumination device.

BRIEF DESCRIPTION OF THE DRAWINGS

The above and other objects and advantages of the present invention will be apparent upon reading of the following description with reference to the attached drawings in which.

DETAILED DESCRIPTION OF THE INVENTION

Figure 1:
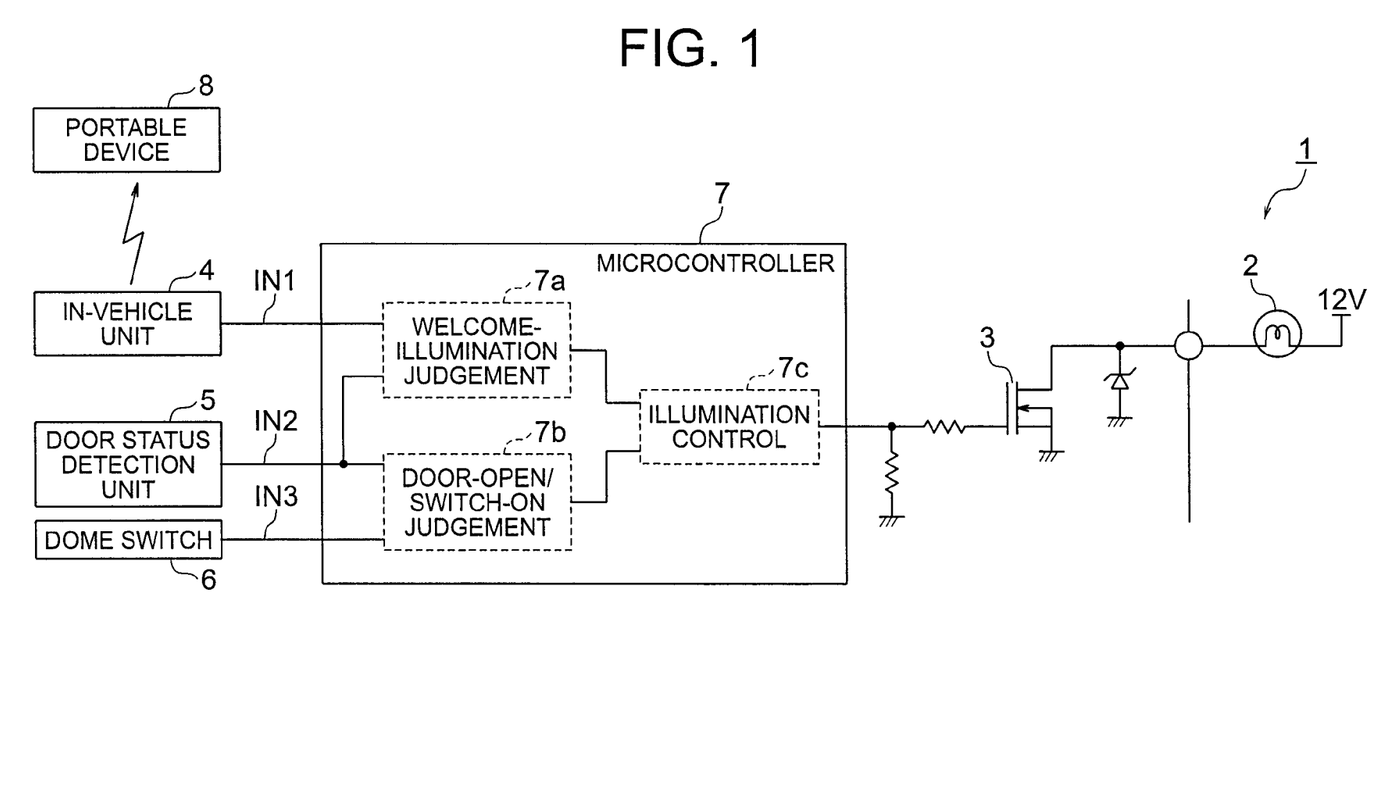
FIG. 1 is an exemplary circuit diagram of a automotive illumination device of the present invention.

With reference now to the figures, and in particular with reference to FIG. 1, there is shown an exemplary circuit diagram of an automotive illumination device according to one embodiment of the present invention.

Referring to FIG. 1, the automotive illumination device 1 includes: (a) a dome lamp bulb 2, which serves as "a lamp" in the context of the present invention; (b) a transistor switch 3; (c) an in-vehicle unit 4, which serves as "a user position detection unit" in the context of the present invention; (d) a door status detection unit 5, the door status being indicative of opening and closing of a door of an automobile or other vehicle; (e) a dome switch 6, which serves as "a manipulation unit" in the context of the present invention; and (f) a microcontroller 7, which serves as "an illumination control unit" in the context of the present invention.

The dome lamp bulb 2 may be an interior lamp provided on an inner surface of a roof of an automobile or any other vehicles. A terminal of the dome lamp bulb 2 is electrically connected to a 12-volt voltage source, and the other terminal thereof to ground via the transistor switch 3.

The transistor switch 3 is provided between the other terminal of the dome lamp bulb 2 and the ground. The transistor switch 3 is configured to control supply and stoppage of electrical voltage to the dome lamp bulb 2.

When the transistor switch 3 is closed (turned on), the 12-volt voltage source is allowed to supply electrical power to the dome lamp bulb 2 so as to turn on the dome lamp bulb 2. When the transistor switch 3 is open (turned off), the 12-volt voltage source ceases to supply the electrical power to the dome lamp bulb 2 so as to turn off the dome lamp bulb 2. A base of the transistor switch 3 is connected to the microcontroller 7, which controls the transistor switch 3 so that the transistor switch 3 is closed and opened in accordance with instructions by the microcontroller 7.

The in-vehicle unit 4 is configured to periodically transmit a request signal to an outside of the automobile to provide wireless communications with a portable device 8 that can be held by a hand of a user of the automobile.

When the request signal is received by the portable device 8 carried by the user approaching (making access to) the automobile, the portable device 8 transmits an answer signal containing an authentication code. when the answer signal is received by the in-vehicle unit 4, the in-vehicle unit 4 checks the authentication code contained in the received answer signal against an authentication code previously stored in the in-vehicle unit 4 or an external memory connected thereto. When authentication of the received authentication code has been successful, an approach-detect signal IN1 is output by the in-vehicle unit 4 to the microcontroller 7, the approach-detect signal IN1 being indicative of the fact that the user approached the automobile.

The door status detection unit 5 may comprise a courtesy switch operable to be turned on and off in response to opening and closure of the door of the automobile and configured to output a door status signal IN2 to the microcontroller 7, the door status signal IN2 being indicative of a door status, i.e., opening and closing of the door.

The dome switch 6 is a switch provided near the dome lamp bulb 2 for manual operation by the user. The dome switch 6 is connected to the microcontroller 7. The dome switch 6 outputs an ON/OFF signal IN3 to the microcontroller 7, the ON/OFF signal IN3 being indicative of an ON/OFF state, i.e., whether the dome switch 6 is turned on or turned off.

The microcontroller 7 includes known components such as a central processing unit (CPU), a ROM unit, and a RAM unit. The microcontroller 7 controls overall functionality of the illumination device 1.

The approach-detect signal IN1, the door status signal IN2, and the ON/OFF signal IN3 are transmitted to the microcontroller 7. On the basis of the signals IN1 to IN3, the microcontroller 7 can detect (i) the user's access to the automobile, (ii) the state of opening and closing of the door, and (iii) the ON/OFF state of the dome switch 6.

The microcontroller 7 performs "welcome-illumination judgment process 7a," which is a set of procedures that determines whether or not "welcome illumination" is performed. The welcome illumination is a mode of illumination of the dome lamp bulb 2 in which the dome lamp bulb 2 is turned on in response to detection of the user's access to the automobile.

Also, the microcontroller 7 performs "door-open/switch-on illumination judgment process 7b," which is a set of procedures that determines whether or not to provide "door-open/switch-on illumination" of the dome lamp bulb 2. The door-open/switch-on illumination is a mode of illumination of the dome lamp bulb 2 in which the dome lamp bulb 2 is turned on when (a) the door is opened or (b) the dome switch 6 is turned on.

Further, the microcontroller 7 controls the transistor switch 3 in response to the judgment results of the welcome-illumination judgment process 7a and the door-open/switch-on illumination judgment process 7b, and performs "illumination control process 7c," which is a set of procedures that controls the state of illumination of the dome lamp bulb 2.

Specifically, when it has been determined that neither the welcome illumination nor the door-open/switch-on illumination is to be performed, the microcontroller 7 opens (turns off) the transistor switch 3 and thus turns off the dome lamp bulb 2.

When it has been determined that either of the welcome illumination and the door-open/switch-on illumination is to be entered, the transistor switch 3 controlled by the microcontroller 7 is controlled at duty ratio of 60 percent to turn on the dome lamp bulb 2 at brightness of 60 percent.

When it has been determined that both of the welcome illumination and the door-open/switch-on illumination are to be entered, the transistor switch 3 is kept closed (turned on) at duty ratio of 100 percent to turn on the dome lamp bulb 2 at brightness of 100 percent.

The operation of the automotive illumination device 1, whose basic configuration has been described in the foregoing, is explained in detail with reference now to FIGS. 2 to 4.

Figure 2:
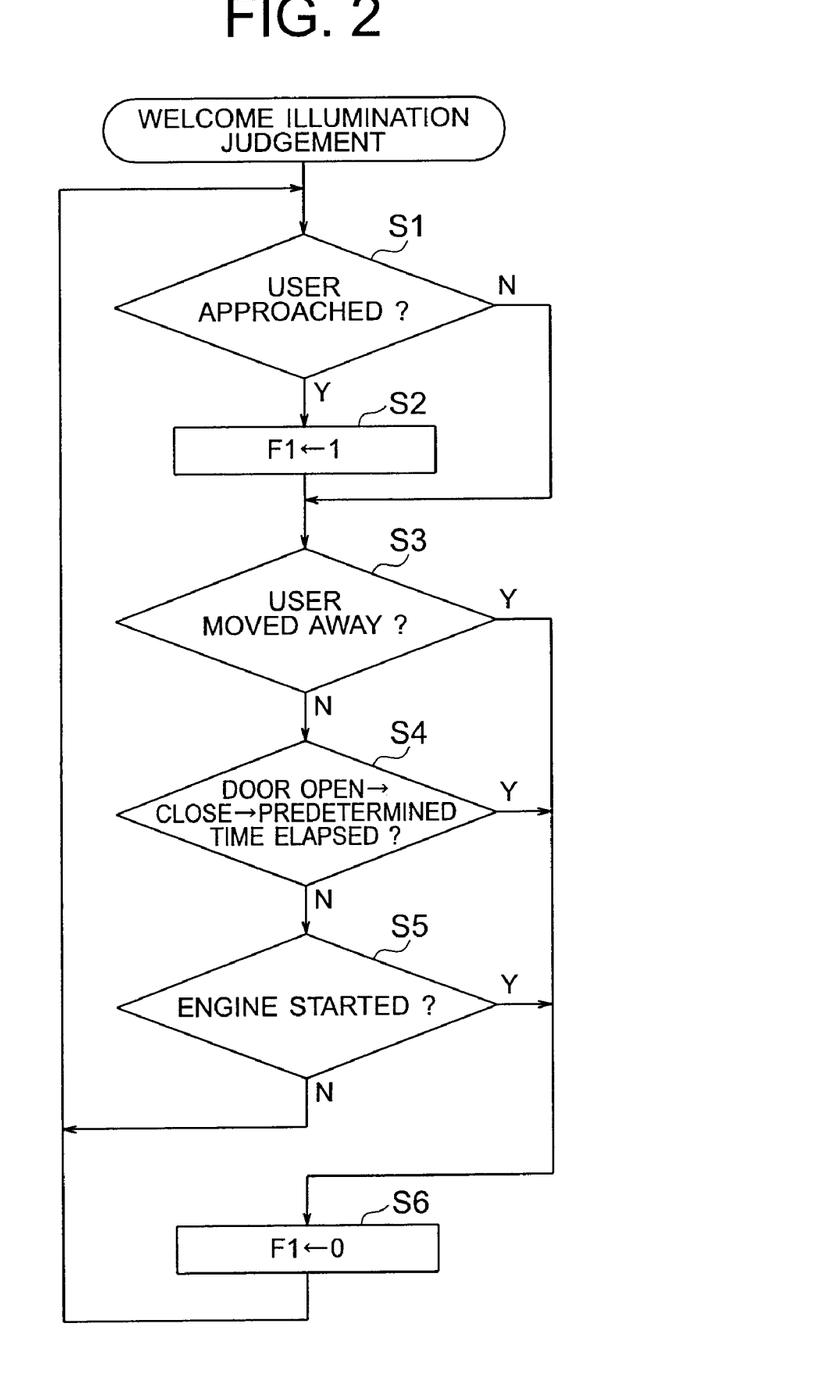
FIG. 2 is a flowchart of welcome illumination judgment process by a microcontroller 7 shown in FIG. 1.

The flowchart of FIG. 2 depicts the welcome illumination judgment process 7a.

At the step S1, the microcontroller 7 judges whether or not the user approached the automobile, the judgment being made on the basis of the approach-detect signal IN1. If it has been detected that the user does not approach the automobile (N in the step S1), the process goes directly to the step S3 without setting a welcome illumination flag F1 to 1. In contrast, when it has been detected that the user approached the automobile (Y in the step S1), the microcontroller 7 determines that the welcome illumination condition has been met, and the process goes to the step S2, where the microcontroller 7 sets the welcome illumination flag F1 to 1.

After that, at the step S3, the microcontroller 7 judges whether or not the user moved away from the automobile, on the basis of the approach-detect signal IN1. If the judgment is affirmative, i.e., when it has been detected that the user moved away from the automobile (Y in the step S3), the microcontroller 7 determines that a terminate-welcome-illumination condition has been met, and the process goes to the step S6 where the microcontroller 7 clears the welcome illumination flag F1 to 0, and then the process goes back to the step S1. The terminate-welcome-illumination condition is a condition for authorizing termination of illumination of the dome lamp bulb 2 in its welcome illumination mode.

Meanwhile, when it has been detected that the user is not away from the automobile (N in the step S3), then the process goes to the step S4 where the microcontroller 7 judges whether or not the door is opened, closed again, and then a predetermined period of time has elapsed, the judgment being made on the basis of the door status signal IN2.

When it has been judged that the door was opened, closed again and then the predetermined period has elapsed (Y in the step S4), the microcontroller 7 determines that the terminate-welcome-illumination condition has been met and clears the welcome illumination flag F1 to 0 (the step S6), and then the process goes back to the step S1.

Meanwhile, when it has not been judged that the door opened, closed, and the predetermined period elapsed (N in the step S4), then the microcontroller 7 judges whether or not an engine of the automobile has been started (the step S5).

At the step S5, if it has been judged that the engine has been started (Y in the step S5), then the microcontroller 7, determines that the terminate-welcome-illumination condition has been met and clears the welcome illumination flag F1 to 0 (the step S6) and the process goes back to the step S1.

If it has been judged that the engine is not started (N in the step S5), then the microcontroller 7 determines that the terminate-welcome-illumination condition is not met, and the process immediately goes back to the step S1 without the welcome illumination flag F1 cleared to 0.

As can be appreciated from the foregoing description, when the user approaches the automobile, the welcome illumination condition is met and the microcontroller 7 sets the welcome illumination flag F1 to 1. Also, if at lest either one of the statements is true consisting of (A) the user moved away from the automobile, (B) the door was opened, closed again, and then the predetermined period elapsed, and (C) the engine is started, then the terminate-welcome-illumination condition is met, and the microcontroller 7 clears the welcome illumination flag F1 to 0.

Figure 3:
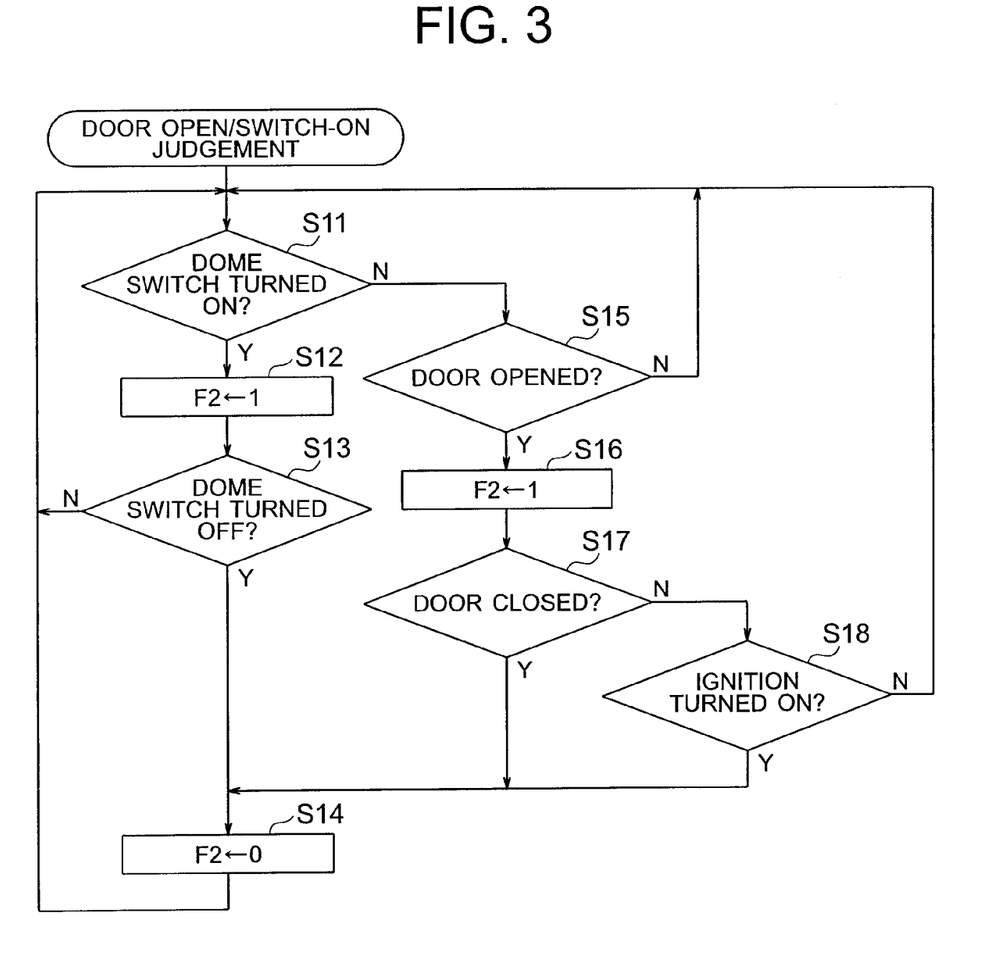
FIG. 3 is a flowchart of door-open/switch-on illumination judgment process of the microcontroller 7 of FIG. 1.

The flowchart of FIG. 3 depicts the door-open/switch-on illumination judgment process 7b.

Referring to the same figure, at the step S11, the microcontroller 7 judges whether or not the dome switch 6 is turned on. If the dome switch 6 is turned on (Y in the step S11), then the microcontroller 7 determines that a "door-open/switch-on illumination" condition has been met and the process goes to the step S12 where the microcontroller 7 sets a door-open/switch-on illumination flag F2 to 1.

At the step S13, the microcontroller 7 judges whether or not the dome switch 6 is turned off. When it has been judged that the dome switch 6 is turned off (Y in the step S13), the microcontroller 7 determines that the terminate-door-open/switch-on-illumination condition has been met and the process goes to the step S14 where the microcontroller 7 clears the door-open/switch-on illumination flag F2 to 0, and the process goes back to the step S11.

Meanwhile, when it has been judged that the dome switch 6 is held closed (N in the step S13), then the microcontroller 7 determines that the terminate-door-open/switch-on-illumination condition is not met, and the process immediately goes back to the step S11 without the door-open/switch-on illumination flag F2 cleared to 0.

In contrast, when the dome switch 6 is not turned on (N in the step S11), then the process goes to the step S15 where the microcontroller 7 judges whether or not the door is opened.

At the step S15, when it has been judged that the door was opened (Y in the step S15), the microcontroller 7 determines that the door-open/switch-on illumination condition has been met and sets the door-open/switch-on illumination flag F2 to 1 (the step S16).

After that, when it has been judged that the door is closed again (Y in the step S17), the microcontroller 7 determines that the terminate-door-open/switch-on-illumination condition has been met and clears the door-open/switch-on illumination flag F2 to 0 (the step S14), and then the process goes back to the step S11. Meanwhile, when it has been judged that the door is left opened (N in the step S17), the process goes to the step S18 where the microcontroller 7 judges whether or not the ignition switch is turned on.

At the step S18, when it has been judged that the ignition switch has been turned on (Y in the step S18), the microcontroller 7 determines that the terminate-door-open/switch-on-illumination condition has been met, and clears the door-open/switch-on illumination flag F2 to 0 (the step S14), and then the process goes back to the step S11. Meanwhile, if the ignition switch is left turned off (N in the step S18), the microcontroller 7 determines that the terminate-door-open/switch-on-illumination condition is not met, and the process immediately goes back to the step S11 without the door-open/switch-on illumination flag F2 cleared to 0.

As can be appreciated from the foregoing description, at least either one of the statement is true consisting of (D) the dome switch 6 was turned on and (E) the door was opened, then the door-open/switch-on illumination condition is met and the microcontroller 7 sets the door-open/switch-on illumination flag F2 to 1.

Also, (F) when the dome switch 6 is turned off after the dome switch 6 was turned on and the door-open/switch-on illumination condition was met, then the terminate-door-open/switch-on-illumination condition is met and the microcontroller 7 clears the door-open/switch-on illumination flag F2 to 0. Meanwhile, if at least either of the statements is true consisting of (G) the door was closed and (H) the ignition switch was turned on after the door was opened and the door-open/switch-on illumination condition was met, then the terminate-door-open/switch-on-illumination condition is met, and the microcontroller 7 clears the door-open/switch-on illumination flag F2 to 0.

Figure 4:
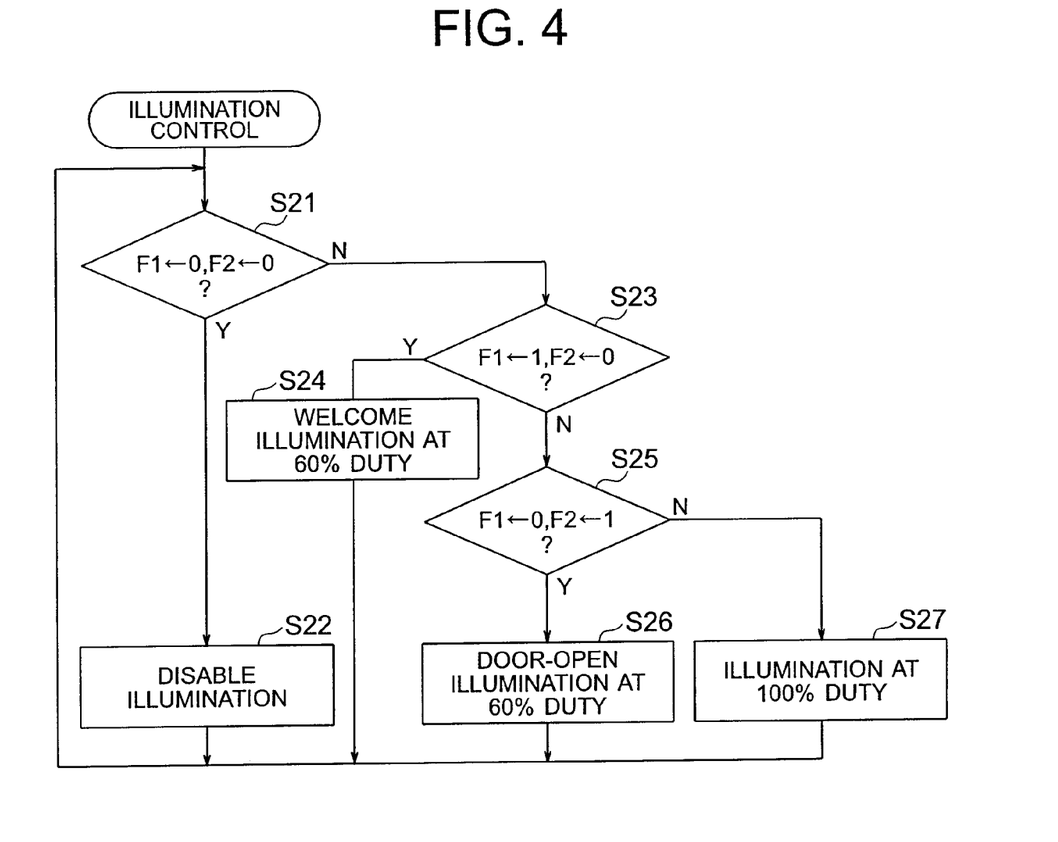
FIG. 4 is a flowchart of illumination control process of the microcontroller 7 of FIG. 1.
Figure 5:
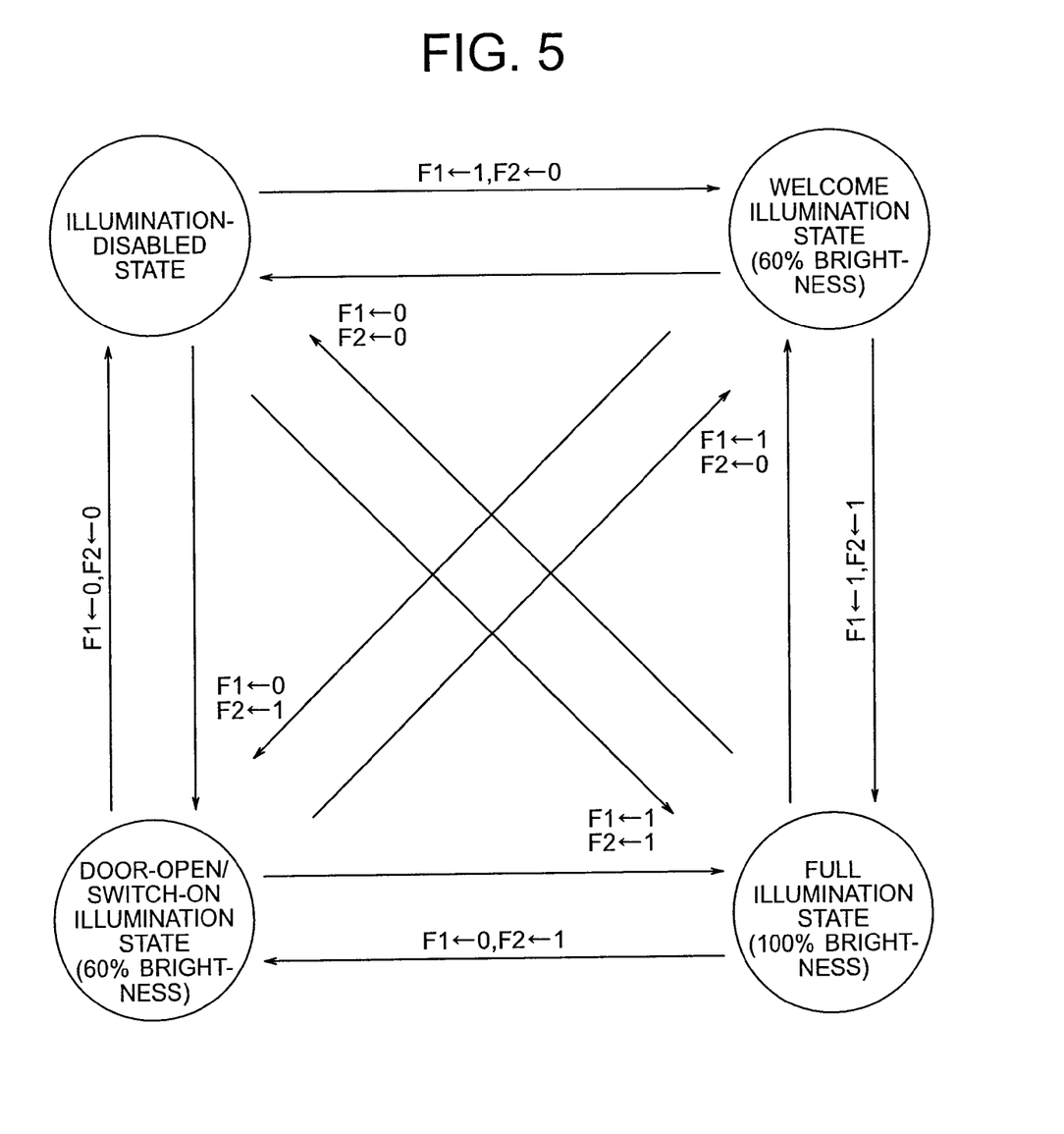
FIG. 5 is a diagram illustrating the illumination control process.

Reference is now made to FIGS. 4 and 5 which illustrates the illumination control process 7c.

At the step S21, if both of the welcome illumination flag F1 and the door-open/switch-on illumination flag F2 are set to 1 (Y in the step S21), the process goes to the step S22 in FIG. 4 where the microcontroller 7 outputs a low-level signal to the transistor switch 3 to turn off the dome lamp bulb 2 (see "illumination-disabled state" of FIG. 5).

At the step S23, if the welcome illumination flag F1 is set to 1 and the door-open/switch-on illumination flag F2 is cleared to 0 (Y in the step S23 of FIG. 4), the process goes to the step S24 where the microcontroller 7 controls open/close of the transistor switch 3 at duty ratio of 60 percent and thus, the dome lamp bulb 2 is turned on at brightness of 60 percent (see "welcome illumination state" of FIG. 5).

Meanwhile, if the welcome illumination flag F1 is cleared to 0 and the door-open/switch-on illumination flag F2 is set to 1 and (N in the step S23 and Y in the step S25), the microcontroller 7, controls open/close of the transistor switch 3 at duty ratio of 60 percent (the step S26) and thus the dome lamp bulb 2 is turned on at 60-percent brightness (see "door-open/switch-on illumination state" of FIG. 5).

If the welcome illumination flag F1 and the door-open/switch-on illumination flag F2 are both set to 1 (N in the step S25), the process goes to the step S27 where the microcontroller 7 controls the transistor switch 3 to be held always closed at duty ratio of 100 percent and thus the dome lamp bulb 2 is turned on at brightness of 100 percent (see "full-illumination state" of FIG. 5).

When the dome lamp bulb 2 is taken out of the illumination-disabled state to enter either of the welcome illumination state, the door-open/switch-on illumination state (60-percent brightness), and the full-illumination state (100-percent brightness), and when the welcome illumination state or the door-open/switch-on illumination state (60-percent brightness) is exited and in turn the full-illumination state (100-percent brightness) is entered, the microcontroller 7 gradually increases the ON/OFF duty ratio of the transistor switch 3 so that the brightness of the dome lamp bulb 2 gradually increases.

Also, when the dome lamp bulb 2 is taken out of either of the welcome illumination state, the door-open/switch-on illumination state (60-percent brightness), and the full-illumination state (100-percent brightness) to enter the illumination-disabled state, or when the full-illumination state (100-percent brightness) of the dome lamp bulb 2 is exited and in turn the welcome illumination state or the door-open/switch-on illumination state (60-percent brightness) is entered, the microcontroller 7 gradually decreases the ON/OFF duty ratio of the transistor switch 3 so that the dome lamp bulb 2 gradually becomes dimmer.

Figure 6A:
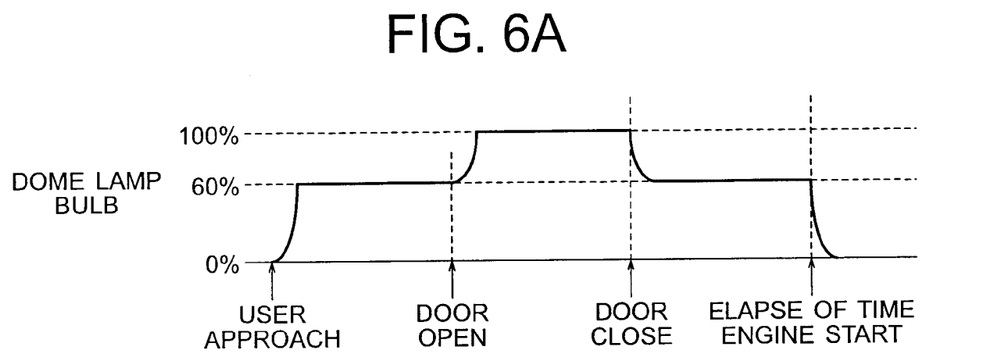
FIG. 6A is a timing chart indicating an illumination state of a dome lamp bulb of the automotive illumination device of FIG. 1.
Figure 6B:
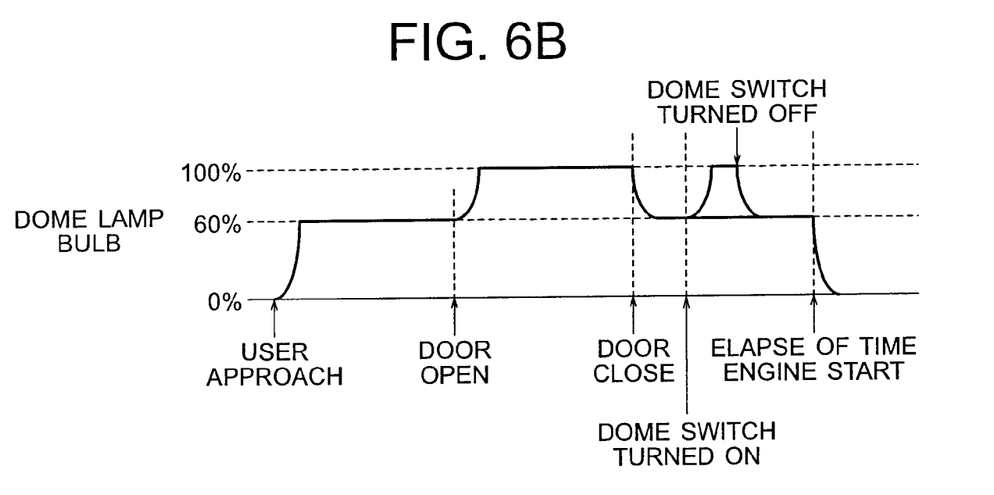
FIG. 6B is a timing chart indicating an illumination state of the dome lamp bulb of the automotive illumination device of FIG. 1.
Figure 6C:
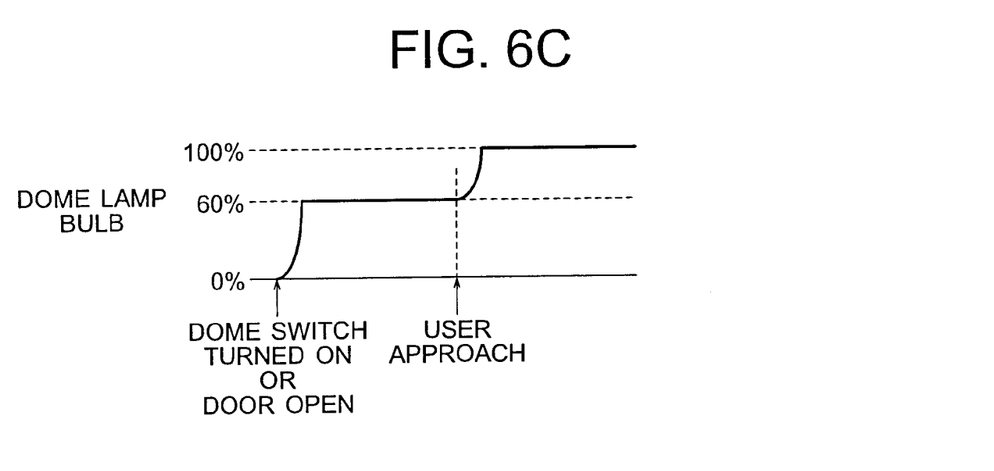
FIG. 6C is a timing chart indicating an illumination state of the dome lamp bulb of the automotive illumination device of FIG. 1.

Referring to FIG. 6, there are shown examples of how the dome lamp bulb 2 is illuminated.

In the example A of FIG. 6, the user carrying the portable device 8 approaches the automobile in a state where the terminate-welcome-illumination condition and the terminate-door-open/switch-on-illumination condition are met (F1 set to 0 and F2 to 0). In this case, the welcome illumination condition will now be met (F1 set to 1 while F2 remains cleared to 0) and the microcontroller 7 turns on the dome lamp bulb 2 at brightness of 60 percent to enter the welcome illumination state.

During the above welcome illumination state, the user may open the door of the automobile and the door-open/switch-on illumination condition will also be met (F1 set to 1 and F2 now set to 1). The microcontroller 7 turns on the dome lamp bulb 2 at brightness of 100 percent to enter the full-illumination state.

Further, when the user is aboard the automobile and the door is closed, the terminate-door-open/switch-on-illumination condition is met (F1 set to 1 and F2 now cleared to 0). The microcontroller 7 restores the brightness of the dome lamp bulb 2 at 60 percent to enter the welcome illumination state. After that, when the predetermined period of time elapses after closing of the door, or when the ignition switch is turned on, the terminate-welcome-illumination condition is met (F1 now cleared to 0, the F2 cleared to 0), the microcontroller 7 places the dome lamp bulb 2 in the illumination-disabled state.

In the example B of FIG. 6, the user is aboard the automobile with the door closed and the terminate-door-open/switch-on-illumination condition has been met. In this situation, when the dome switch 6 is turned on before lapse of the predetermined period after the closing of the door, or before the ignition switch is yet to be turned on, then the door-open/switch-on illumination condition will again be met (F1 set to 1 and F2 set to 1), and the microcontroller 7 increases the brightness of the dome lamp bulb 2 to 100 percent to enter the full-illumination state. Thus, when the door is opened or the dome switch 6 is turned on after the user approached the automobile, then the brightness of the dome lamp bulb 2 increases, so that it is possible to provide the same visual effects using a single light as using two separate lights with reduced manufacturing costs.

In the example C of FIG. 6, when the dome switch 6 is turned on or the door is opened, the door-open/switch-on illumination condition is met. In this situation, if the welcome illumination is not met (F1 cleared to 0 and F2 set to 1), then the microcontroller 7 turns on the dome lamp bulb 2 at brightness of 60 percent to enter the door-open/switch-on illumination state. When the user moves away from the automobile with the dome switch 6 left turned on or with the door left opened and again the user approaches the automobile, then the welcome illumination condition is met (F1 set to 1 and F2 set to 1), and the microcontroller 7 turns on the dome lamp bulb 2 at brightness of 100 percent to enter the full-illumination state. Thus, when the user approaches the automobile while the dome lamp 6 is turned on or the door is opened, then the brightness of the dome lamp bulb 2 increases, making it possible to provide the same visual effects using the single light as using the two separate lights.

Although the dome lamp bulb 2 in the above-described embodiment is turned on at the same brightness in the case of F1 cleared to 0 and F2 set to 1 as in the case of F1 set to 1 and F2 cleared to 0 (i.e., at the duty ratio of 60 percent), the present invention also contemplates other situations. For instance, the dome lamp bulb 2 may be turned on in the case of F1 cleared to 0 and F2 set to 1 at a brightness different from that in the case of F1 set to 1 and F2 cleared to 0.

Although the transistor switch 3 in the above-described embodiment is kept always closed or turned on (at duty ratio of 100 percent) to place the bulb in the full-illumination state. The present invention, however, also contemplates other situations. For instance, the brightness in the full-illumination state has only to be larger than those in the welcome illumination state and the door-open/switch-on illumination state, and accordingly may be less than 100 percent.

In this embodiment, the "terminate-welcome-illumination" condition is met after lapse of the predetermined period of time following the opening of the door and the subsequent closing of the door, or when the engine is turned on. The present invention is not limited to this specific embodiment. For example, the terminate-welcome-illumination condition may be met when the locking of door has been detected.

Further, in the above-described embodiment, the dome lamp on the inner surface of the roof of the automobile is used as the lamp in the context of the present invention, which merely is an example. The light may be any one that is provided in or on the automobile.

In the foregoing specification, the present invention has been described with reference to specific embodiment thereof. It will be appreciated that various modifications and changes can be made thereto without deviating from the spirit and scope of the invention as set forth in the appended claims. Also, the specification and drawings should be regarded in an illustrative rather than a restrictive sense.

What is claimed is:

1. An automotive illumination device comprising:
   a lamp provided in an automobile;
   a manipulation unit configured to turn on and turn off the lamp;
   a user position detection unit configured to detect user's access to the automobile from outside thereof;
   a door status detection unit configured to detect a door status indicative of opening and closure of a door of the automobile; and
   an illumination control unit configured to provide welcome illumination in which the lamp is turned on at a first brightness in response to the user's access to the automobile detected by the user position detection unit, and configured to turn on the lamp at a second brightness if opening of the door is detected by the door status detection unit during the welcome illumination, or if the manipulation unit is turned on during the welcome illumination, wherein the second brightness is larger than the first brightness.

2. The automotive illumination device as set forth in claim 1, wherein the illumination control unit is configured to provide door-open/switch-on illumination in which the lamp is turned on at a third brightness if the opening of the door is detected by the door status detection unit or the manipulation unit is turned on while the welcome illumination is not entered, wherein the third brightness is lower than the second brightness, and the illumination control unit is configured to turn on the lamp at the second brightness when the user's access to the automobile is detected by the user position detection unit during the door-open/switch-on illumination.

* * * * *